Sept. 17, 1935.  E. T. PEDRANTI  2,014,482
AXLE SHIM
Original Filed May 4, 1931
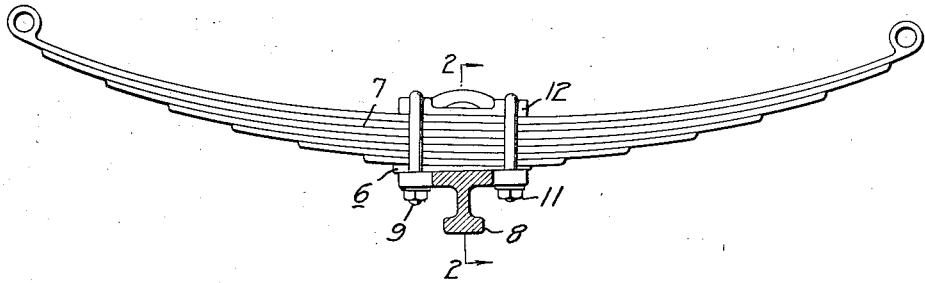
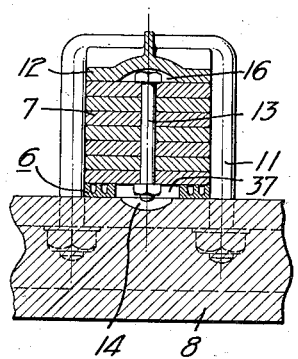
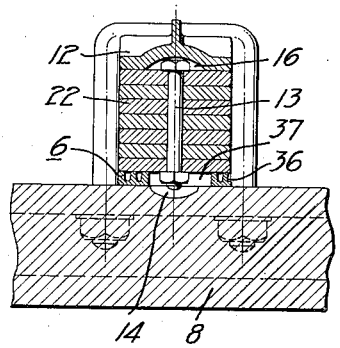
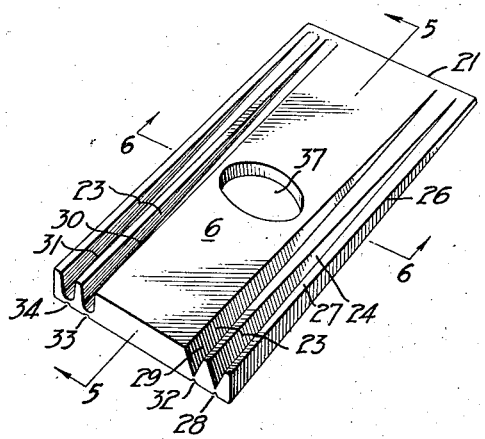
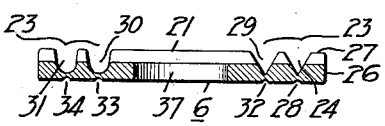
INVENTOR.
Eugene T. Pedranti
BY
White, Prost, Fehr & Lothrop
ATTORNEYS.

Patented Sept. 17, 1935

2,014,482

UNITED STATES PATENT OFFICE 2,014,482

AXLE SHIM

Eugene T. Pedranti, Petaluma, Calif.

Application May 4, 1931, Serial No. 534,742
Renewed June 2, 1934

3 Claims. (Cl. 267—52)

My invention relates to shims primarily intended for interposition between the spring and axle of an automotive vehicle for varying the relative relationship between the spring and the axle.

In modern automotive practice, particularly on vehicles provided with four-wheel brakes and balloon tires, it is extremely important that the axle be related to the vehicle frame with a predetermined amount of inclination. After a vehicle has been in use for a considerable time the springs change their shape and due to a general wear of the parts the inclination of the axle may not be exactly of the degree desired. There has therefore been employed extensively a shim for interposition between the spring and the axle for changing the relative relationship of the spring and the axle and restoring or establishing the axle at the predetermined or desired degree of inclination. On different vehicles the spring width varies considerably, usually in increments of a standard or equal amount. This entails the carrying in stock of a relatively large supply of shims of different width in order to accommodate different vehicles having springs of different widths. In addition, the shims may vary in degree of dihedral angle in several different increments so that it is necessary for a relatively large and varied stock of shims of different degrees of inclination and width to be carried.

It is, therefore, an object of my invention to provide an axle shim which can be used with springs of different widths.

Another object of my invention is to provide an axle shim which can easily be adapted to use with springs of different widths.

A further object of my invention is to provide a cheap, strong shim which can quickly be suited to the need of an individual vehicle.

The foregoing and other objects are attained in the embodiment of the invention shown in the drawing, in which Figure 1 is a side elevation of a spring and axle with a shim of my invention in place.

Figure 2 is a cross section on the line 2—2 of Figure 1.

Figure 3 is a cross section similar to that of Figure 2 but showing the shim of my invention in use with a spring of different width.

Figure 4 is a perspective of an axle shim constructed in accordance with my invention.

Figure 5 is a cross section on the line 5—5 of Figure 4.

Figure 6 is a cross section on the line 6—6 of Figure 4.

In its preferred form, the axle shim of my invention comprises an integral plate having a relatively weak zone to facilitate the separation of a portion of said plate.

As shown in Figures 1 and 2, the shim 6 of my invention is preferably interposed between a spring 7 and an axle 8 of a vehicle. Spring clips 9 and 11 piercing suitable apertures in the axle encompass the spring 7 and hold it in place. Usually a saddle 12 is superposed on the spring 7 and is grooved to receive the loops of the spring clips 9 and 11 and assist in holding the assembly in proper relationship. Customarily the spring 7 is held by a spring bolt 13 piercing the various leaves of the spring. A recess 14 in the axle accommodates the end of the spring bolt 13 while a depression 16 in the saddle 12 accommodates the head of the spring bolt 13. As especially indicated in Figure 2, the spring clips 9 and 11 lie closely against the sides of the spring 7 to prevent sidewise displacement thereof with respect to the axle 8.

In constructing an axle shim in accordance with my invention I preferably provide a plate 21 usually of cast metal such as bronze, brass, iron or the like. The plate is generally rectangular in plan and is wedge-shape in cross section, as shown in Figure 5. The transverse dimension or width of the plate 21 is preferably equal to the width of a spring 7 of the maximum size so that the plate is snugly retained by the spring clips 9 and 11 when in installed position.

In order that the axle shim can be used in conjunction with a spring 22 of lesser width, as indicated in Figure 3, I preferably provide the plate 21 with a relatively weak zone 23 by casting the plate 21 with a longitudinal groove 24 therein. Preferably the groove 24 is parallel to the side 26 of the plate 21 and demarks an easily separable marginal portion 27 of the plate. The groove 24 can be of any desired contour and the right hand portion of the plate 21 shown in Figure 4 is provided with a V-shaped groove which extends nearly through the material of the plate and preferably is in alignment with an additional score or groove 28 impressed or otherwise provided in the opposite or nether face of the plate 21.

In order to accommodate a large number of springs of varying width I preferably provide a number of grooves 29, 30 and 31 in the plate 21 each with a cooperating groove 32, 33 and 34 in the nether face of the plate 21. For illustrating the various cross sectional shapes which the grooves can assume, the grooves 30 and 31 in Figure 4 are of U-shape in contour while the grooves 33 and 34 likewise are U-shaped. The spacing of the various grooves from the longitudinal axis of the plate is such that one or more of the readily separable portions of the plate can be detached either from the same edge of the plate or from opposite edges thereof in order to leave a remaining portion of the exact width desired for snug retention by the spring clips. Such a portion 36 is shown in Figure 3.

Since in some instances but a single, easily separable portion 27 will be removed from the plate 21 I preferably provide a central aperture 37 which is elongated transversely of the plate 21 so that despite a relative shifting laterally of the plate, the end of the spring bolt 13 nevertheless is as well received in the aperture as with the form shown in Figure 2.

In accordance with my invention I have provided an axle shim which is adaptable to springs of various widths simply by clamping the main body or portion of the plate 21 in a vise and by a hammer blow or by other means severing the separable portion along the relatively weak zone 23. For convenience in gripping the shim in a vise it is customary to superpose two of the shims in opposite relationship so that their outer faces are parallel and can easily be held and both of them are therefore suitably clamped for separation of one or more of the marginal portions.

It is to be understood that I do not limit myself to the form of the axle shim shown and described herein, as the invention as set forth in the following claims may be embodied in a plurality of forms.

I claim:

1. An axle shim comprising a plate having therein a central aperture elongated transversely of said plate and a groove extending longitudinally of said plate for demarking an easily separable portion of said plate.

2. An axle shim comprising a cast metal rectangular plate wedge-shape in cross section having therein a central aperture elongated transversely of said plate and a groove of varying depth extending longitudinally of said plate for demarking an easily separable portion of said plate.

3. As an article of manufacture, an axle shim having detachable lateral edge portions, said shim being pierced to provide a central aperture laterally elongated to accommodate a bolt located centrally of said shim despite detachment of one or more of said edge portions.

EUGENE T. PEDRANTI.